Patented Sept. 26, 1944

2,358,786

UNITED STATES PATENT OFFICE 2,358,786

METHOD OF PREPARING β-THIO-ETHYLAMINES

Marston T. Bogert, New York, and Edward J. Mills, Jr., New Rochelle, N. Y., assignors to E. R. Squibb & Sons, New York, N. Y., a corporation of New York No Drawing. Application May 11, 1940,
Serial No. 334,581

3 Claims. (Cl. 260—583)

This invention relates to, and has for its object the provision of, a simple and efficient method of preparing β-thio-ethylamines of the general formula

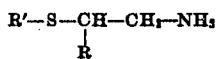

especially β-mercapto-ethylamines of the general formula

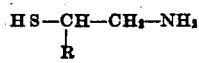

wherein R and R' represent each a member of the group consisting of hydrogen, aliphatic (preferably lower alkyl) groups, aromatic (preferably phenyl) groups, and araliphatic (preferably phenyl-lower-alkyl) groups. Such compounds, especially the β-mercapto-ethylamines, are valuable intermediates for the production of medicinally and otherwise utilizable compounds. Thus, β-mercapto-ethylamine can be readily converted by oxidation into cystamine [bis-(β-amino-ethyl)-disulfide], and both of these inexpensively-produced compounds can be used for the production—at a much lower cost than hitherto—of the corresponding sulfo acids, sulfoxides, sulfones, ureides, barbituric acids, pyrimidines, purines, and the like.

The process of this invention essentially comprises reacting a compound of the general formula R'—SH with an R-ethyleneimine in a solvent for the reactants—the term "R-ethyleneimine" being employed herein to embrace not only R-ethyleneimine strictly so called (in which the R is attached to a carbon atom) but also the equally operative β-R-vinylamine. The heretofore-reported interaction of hydrogen sulfide and ethyleneimine—Gabriel and Eschenbach, Ber. 30, 2497, passed hydrogen sulfide through ethyleneimine to produce bis-(β-amino-ethyl)-sulfide—was under qualitatively different conditions.

In the practice of this invention, hydrogen sulfide and ethyleneimine may be interacted in a solvent for both, e. g., alcohol, to produce β-mercapto-ethylamine in almost quantitative yield, the hydrogen sulfide being present in high concentration relative to the ethyleneimine. Conveniently the ethyleneimine (preferably in solution) may be added slowly to a solution of hydrogen sulfide, preferably while cooling and passing a current of hydrogen sulfide through the reaction mixture.

The following examples are illustrative of the invention:

Example 1

A well-cooled 10% solution of ethyleneimine (B. P. 54–56° C.) in 95% ethyl alcohol is added slowly to an equal volume of well-stirred 95% ethyl alcohol previously saturated with hydrogen sulfide and cooled to 0° C. During this addition, the temperature of the mixture is held at 0° C., and a current of hydrogen sulfide is kept passing through continuously. After the addition of the ethyleneimine is completed, the hydrogen sulfide current is maintained for 10 or 15 minutes. Excess hydrogen sulfide is removed from the cold mixture by reducing the pressure. The reaction mixture is concentrated to a small volume in an inert atmosphere under reduced pressure, until the β-mercapto-ethylamine begins to separate as a white crystalline solid. The mixture is then cooled to 0° C., the crystalline solid rapidly filtered out, washed once with petroleum ether, dried, and stored in an inert atmosphere, to prevent its oxidation to the disulfide. The white crystalline product thus obtained usually melts at about 97–98.5° C. (corr.), and can be further purified if necessary. Gabriel and Colman (Ber., 45, 1644), reported a M. P. of 99–100° C. for the pure substance.

Example 2

To a reaction mixture obtained as detailed in the foregoing example, there is added an equal volume of 95% ethanol saturated with HCl. The solution is then concentrated, in an inert atmosphere and under reduced pressure, to a viscous syrup, absolute ethanol is added and the solution cooled. The β-mercapto-ethylamine hydrochloride which separates is removed, washed with a small quantity of chilled absolute ethanol, and dried. The product is a white crystalline solid melting at about 70.2–70.7° C. (corr.); Gabriel and Leupold (Ber. 31, 2837) gave a melting point of 70–72° C. for this compound. The salt may be converted into the free amine in the conventional manner.

The yield of β-mercapto-ethylamine obtained by the foregoing procedures is 85–95% of the theoretical (calculated on the ethyleneimine used).

Manifestly, other β-mercapto-ethylamines of the general formula given hereinbefore may be prepared by the procedures of the foregoing examples, using the corresponding R-ethyleneimine in place of ethyleneimine. Thus, by using propenylamine, β-methyl-β-mercapto-ethylamine can be prepared; by using styrylamine, β-phenyl-β-mercapto-ethylamine can be prepared; and by using a β-araliphatic-vinylamine, a β-araliphatic-β-mercapto-ethylamine can be prepared.

Manifestly, also other β-thio-ethylamines of the general formula given above may be prepared by the procedures of the foregoing examples, replacing the hydrogen sulfide with the corresponding R'—SH compound. Thus, by using ethyl mercaptan, a β-ethylthio-β-R-ethylamine can be prepared; by using benzyl mercaptan, a β-benzylthio-β-R-ethylamine can be prepared; and by using phenyl mercaptan, a β-phenylthio-β-R-ethylamine can be prepared.

The invention may be variously otherwise embodied, within the scope of the appended claims.

We claim:

1. The method of preparing a β-mercapto-ethylamine of the general formula $$HS-CH-CH_2-NH_2$$
$$|$$
$$R$$

which comprises slowly adding an R-ethyleneimine to a solution of hydrogen sulfide in a solvent for the R-ethyleneimine, wherein R represents a member of the group consisting of hydrogen, lower alkyl, and phenyl.

2. The method of preparing a β-mercapto-ethylamine of the general formula $$HS-CH-CH_2-NH_2$$
$$|$$
$$R$$

which comprises slowly adding a solution of an R-ethyleneimine, wherein R represents a member of the group consisting of hydrogen, lower alkyl, and phenyl, to a solution of hydrogen sulfide.

3. The method of preparing β-mercapto-ethylamine which comprises slowly adding a solution of ethyleneimine to a solution of hydrogen sulfide.

MARSTON T. BOGERT.
EDWARD J. MILLS, Jr.